United States Patent [19]
Tamamura et al.

[11] Patent Number: 4,758,855
[45] Date of Patent: Jul. 19, 1988

[54] SHAFT HOLDING STRUCTURE FOR HOLDING SHAFT IN ARTICLE OF RESINOUS MATERIAL

[75] Inventors: Hideo Tamamura, Kanagawa; Hiroshi Maeno, Tokyo, both of Japan

[73] Assignee: Canon Kabushiki Kaisha, Tokyo, Japan

[21] Appl. No.: 929,279

[22] Filed: Nov. 12, 1986

[30] Foreign Application Priority Data

Nov. 21, 1985 [JP]  Japan ............................ 60-179231[U]

[51] Int. Cl.⁴ ........................ G03B 17/02; E05D 7/08
[52] U.S. Cl. ...................................... 354/288; 16/379
[58] Field of Search .................... 354/288, 64, 81, 82, 354/202, 203, 293; 24/69 J, 70 J; 63/DIG. 3, 3, 7, 9; 16/379, 380; 224/902, 908; 368/281, 282; 59/82; 292/DIG. 5, DIG. 49; 211/7

[56] References Cited

U.S. PATENT DOCUMENTS

| 921,759 | 5/1909 | Walker | 63/3 X |
|---|---|---|---|
| 1,175,550 | 3/1916 | Murray | 16/380 X |
| 2,089,327 | 8/1937 | Barker | 16/379 X |
| 2,921,810 | 1/1960 | Smith | 292/DIG. 49 X |
| 4,152,065 | 5/1979 | Kobori | 354/288 |
| 4,231,651 | 11/1980 | Tsuruoka | 354/288 |
| 4,247,028 | 1/1981 | Maitani et al. | 224/908 X |
| 4,281,343 | 7/1981 | Monteiro | 354/64 X |
| 4,348,095 | 9/1982 | Suzuki et al. | 354/288 |

FOREIGN PATENT DOCUMENTS 436138  11/1967  Switzerland ...................... 368/282

Primary Examiner—Donald A. Griffin
Attorney, Agent, or Firm—Fitzpatrick, Cella, Harper and Scinto

[57] ABSTRACT

There is disclosed a shaft holding structure for holding a metallic shaft embedded at its both ends in an article of resinous material by insert-molding in which at least one end of said metallic shaft extends into a void formed in said resinous material, said void having a sectional area larger than that of said metallic shaft.

60 Claims, 3 Drawing Sheets

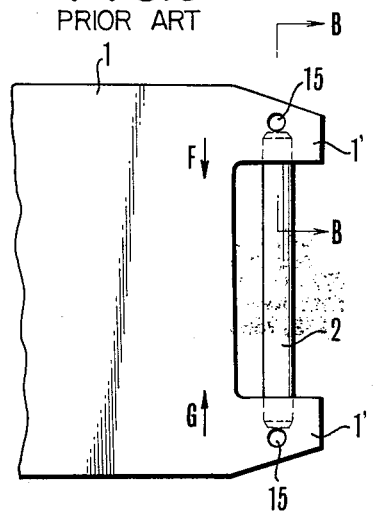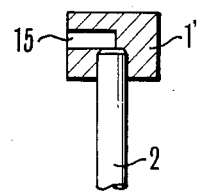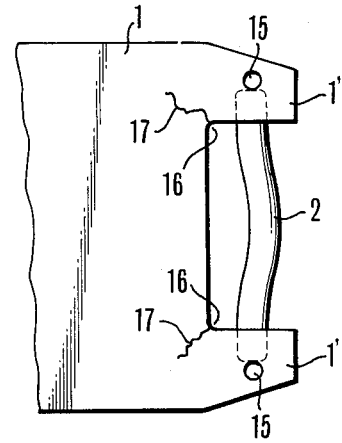

SHAFT HOLDING STRUCTURE FOR HOLDING SHAFT IN ARTICLE OF RESINOUS MATERIAL

BACKGROUND OF THE INVENTION

1. Field of the Invention

The present invention relates to a shaft holding structure for holding a shaft, such as a rear cover supporting shaft, a strap supporting shaft of a camera or the like, in an article of resinous material.

2. Description of the Related Art

An example of a shaft holding structure of this kind is illustrated in FIG. 4, which shows a shaft for supporting a rear cover of a camera. In this example, a rear cover 1 is pivotally supported on a camera body 4 by means of a hinge 5. The rear cover 1 is held in a closed position to the camera body 4 by fastening a buckle 3 onto a metallic shaft 2 which is supported at both ends by projections 1' of the rear cover 1.

In case of the rear cover 1 which is made of resinous material, the shaft holding structure is sometimes formed by a so-called insert-molding process. That is, at the time of injection molding of the rear cover, the metallic shaft is embedded at its end portions in the resinous material of the projections 1' of the rear cover 1. FIG. 5 is a plan view showing the shaft holding structure formed by the insert-molding process according to the prior art and FIG. 6 is a sectional view taken along a line B—B in FIG. 5. In these figures, the numeral 15 indicates an impression which was formed by a positioning pin planted on an inside wall of a mold to decide the axial position of the shaft 2 at the time of injection molding of the rear cover.

The shaft holding structure formed by insert-molding according to the prior art presents a serious problem. That is, the metallic shaft tends to bend due to the contraction of the synthetic resin after molding or tends to cause cracks at stress concentrating portions of the rear cover. Explaining more in detail, it is assumed that the camera body is made of polycarbonate resin, in which glass fibers are contained in the ratio of 12%, which has thermal expansion coefficient of about $50 \times 10^{-6}$, and the shaft is made of iron, which has thermal expansion coefficient of $12 \times 10^{-6}$. The temperature of the mold at the time of molding is normally about 100° C. Under such conditions, when the shaft having a length of 100 mm, for example, is cooled to the room temperature of 20° C. after molding the rear cover of the camera, the length of the shaft and the corresponding length of the rear cover produce contractions in the F and G directions, as described below. The contraction of the rear cover made of polycarbonate is $50 \times 10^{-6} \times (100-20) \times 100 = 0.4$ mm, while the contraction of the shaft made of iron is $12 \times 10^{-6} \times (100-20) \times 100 = 0.096$ mm, with the result that a dimensional difference of about 0.3 mm is produced therebetween. However, in the example as shown in FIGS. 5 and 6, in which the shaft 2 is wholly enclosed at its both ends by the resinous material and completely connected to the latter, the above-mentioned dimensional difference produces an internal stress, which tends to produce bending of the shaft 2 or cracks 17 at the corners 16 of the bifurcated projections 1' of the rear cover 1, as shown in FIG. 7.

The above-mentioned problem is not limited to the case of the camera but is generally caused in the case of an article made of resinous material having a shaft holding structure in which a metallic shaft is held at its both ends in the resinous material by insert-molding.

SUMMARY OF THE INVENTION

It is an object of the present invention to provide a shaft holding structure for holding a shaft in an article of resinous material by insert injection molding, in which the generation of cracks of the article or bending of the shaft due to the contraction of the resinous material is avoided.

With the object as described above, the present invention provides a shaft holding structure for holding a metallic shaft embedded at both ends in an article of resinous material by insert-molding, in which at least one end of said metallic shaft extends into a void formed in said resinous material, said void having a sectional area larger than that of said metallic shaft. According to this shaft holding structure, the above-mentioned end of the shaft is movable in the void formed in the resinous material, so that the generation of forcible internal stress and the attendant generation of cracks of the resinous material or bending of the shaft due to such internal stress can be avoided.

The other objects of the present invention will be understood from the descriptions concerning the preferred embodiments of the invention.

BRIEF DESCRIPTION OF THE DRAWINGS

FIG. 5 is a plan view showing the shaft holding structure according to the prior art.

FIG. 6 is a sectional view taken along the line B—B in FIG. 5.

FIG. 7 is a plan view illustrating the cracks and the bending of the shaft in the shaft holding structure shown in FIG. 5.

DETAILED DESCRIPTION OF THE PREFERRED EMBODIMENTS

Now the present invention will be described, with reference to the drawings which illustrate the preferred embodiments of the present invention.

Figure 1:
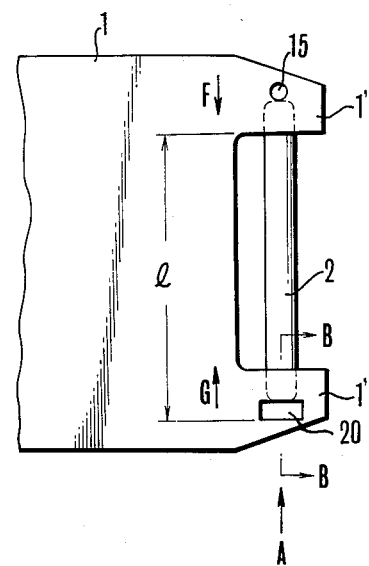
FIG. 1 is a plan view showing a preferred embodiment of the present invention.
Figure 2:
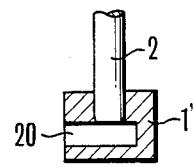
FIG. 2 is a sectional view taken along the line B—B in FIG. 1.
Figure 3:
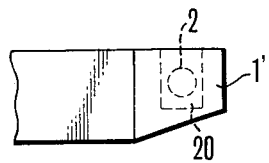
FIG. 3 is a side view taken from the direction A in FIG. 1.
Figure 4:
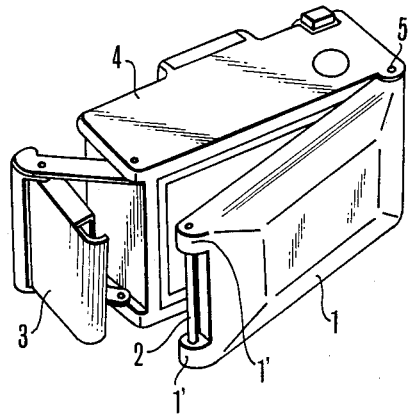
FIG. 4 is a perspective view showing a camera.

FIG. 1 is a plan view showing the embodiment of the shaft holding structure according to the present invention which is used to support a rear cover of a camera. FIG. 2 shows a section along the line B—B in FIG. 1. FIG. 3 is a side view seen in the direction indicated by the arrow A in FIG. 1. In these figures, the parts corresponding to those shown in FIGS. 4 and 5 are indicated by the same numerals.

Referring to FIGS. 1-3, a metallic shaft 2 is embedded at its ends in bifurcated projections 1' of the rear cover 1 of resinous material by the insert-molding. At the position of the bifurcated projections 1' in which one end of the shaft 2 is embedded, a void 20 having a sectional area larger than that of the shaft 2 is formed in the resinous material. Thsu, the end of the shaft 2 extends in the void, without being enclosed in the resinous material. At the position of the projection 1' in which the other end of the shaft 2 is embedded, an impression 15 is formed by a positioning pin which was used to decide the axial position of said shaft at the time of injection molding of the rear cover, in the same manner as in the case of the above-mentioned conventional structure. The void 20 may be formed as an impression of a square pillar placed on an inside wall of a mold which was used to cooperate with the above-mentioned positioning pin to decide the axial position of the shaft 2 at the time of injection molding of the rear cover.

In the above-mentioned construction, if the rear cover 1 produces contraction in the directions as indicated by the arrows F and G, the one end of the shaft 2 slides into the void 20, thereby preventing occurrence of the forcible internal stress, so that the generation of bending of the shaft 2 or cracks in the rear cover 1 is avoided.

The shaft 2 is movable in axial direction as described above, so that if the shaft moves in the resinous material until the one end of the shaft comes into contact with the bottom (the lower bottom in case of FIG. 1) of the void 20, the other end of the shaft can move out of the projection 1' of the rear cover 1. In order to prevent the other end from moving out of the projection, the distance between the inside surface of the projection 1' and the bottom of the void 20 (indicated by l in FIG. 1) must be shorter than the length of the shaft 2.

Figure 8:
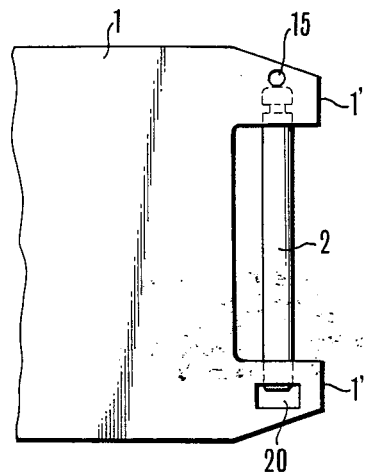
FIG. 8 is a plan view showing another embodiment of the present invention.
Figure 9:
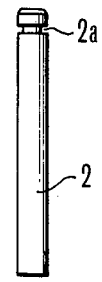
FIG. 9 shows the shaft shown in FIG. 8.

FIGS. 8 and 9 illustrate another embodiment of the present invention. In this embodiment, a shaft 2 having a groove 2a or a knurled portion on its one end portion, as shown in FIG. 9, is embedded in one of the projections 1' of the rear cover 1 by insert-molding, as shown in FIG. 8. In such construction, the one end of the shaft 2 is fixedly held by one of the projections 1', so that the shaft 2 is prevented from deeply moving into the void 20 and therefore the shaft cannot move out of the projection 1'.

In the embodiments as described above, the void 20 is formed in the resinous material at only one end portion of the shaft. However, similar voids may be formed at both end portions of the shaft.

Figure 10:
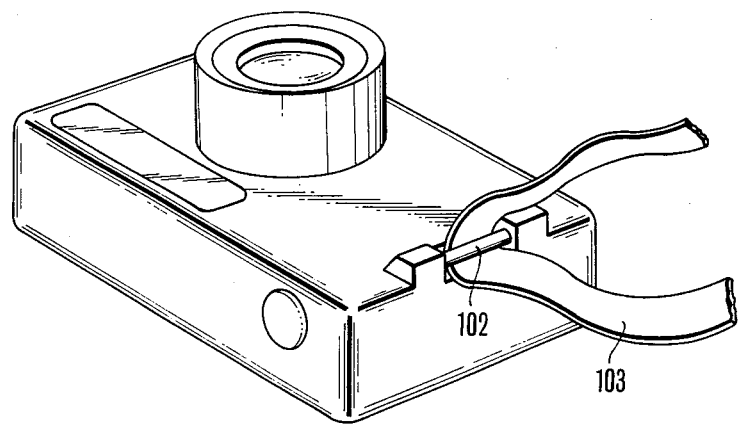
FIG. 10 is a perspective view showing a camera having a strap supporting shaft.

Although the above-mentioned embodiments are directed to the shaft holding structure for holding the shaft onto which the buckle 3 of the rear cover of the camera is fastened, the present invention is applicable to the sahft which is used as a hinge shaft of the rear cover. The present invention is also applicable to the shaft holding structure for holding a shaft for supporting a strap. Such embodiment is illustrated in FIG. 10. In the embodiment as shown in FIG. 10, the shaft holding structure is used to hold a shaft 102 on which a strap 103 for a camera is supported.

Furthermore, the present invention is not limited to the application to a camera, but is generally applicable to a shaft holding structure in which a metallic shaft is held at its both ends in an article of resinous material by insert-molding.

It will be understood that the present invention provides a shaft holding structure for holding a shaft embedded at its both ends in an article of resinous material, in whcih the generation of forceable internal stress due to contraction of the resinous material and the attendant generation of cracks of the article or bending of the shaft can be avoided. This shaft holding structure is simple in construction and easy to manufacture and it presents a good appearance.

What is claimed is:

1. A resinous structure in which a shaft member is embedded by insert-molding, comprising:
   (A) a metallic shaft member; and
   (B) a resinous structure in which said shaft member is embedded by insert-molding, said resinous structure having a portion allowing intrusion thereinto of said shaft member so as to prevent internal stress due to the insert-molding, said portion being located at a portion of said resinous material to which at least one end of said shaft member extends.

2. A resinous structure according to claim 1, wherein said portion has an opening for allowing the intrusion of the shaft member larger than the cross-section of said shaft member.

3. A resinous structure according to claim 1, wherein said resinous structure has a first holding portion and a second holding portion to hold the shaft member embedded therein, both holding portions being formed integrally.

4. A resinous structure according to claim 3, wherein said resinous structure has a portion where said shaft member is exposed to the exterior.

5. A resinous structure according to claim 1, wherein said resinous structure embedded with the shaft member is applied to a camera.

6. A resinous structure according to claim 5, wherein said shaft member includes a buckle shaft for holding a cover of a camera.

7. A resinous structure according to claim 5, wherein said shaft member includes a holding shaft in a camera.

8. A resinous structure according to claim 1, wherein said portion allowing the intrusion of the shaft member includes a void.

9. A resinous structure according to claim 1, wherein said portion for allowing the intrusion of the shaft member is located only at a position to which one end of the shaft member extends.

10. A resinous structure according to claim 1, wherein said shaft member includes a structure which prevents the movement of the shaft member relative to the resinous structure.

11. A resinous structure embedded with a shaft member by insert-molding, comprising:
    (A) a shaft member; and
    (B) a resinous structure in which the shaft member is embedded by insert-molding, said resinous structure being made of resin material having a thermal expansion coefficient different from that of said shaft member, and having a portion allowing intrusion thereinto of said shaft member so as to prevent internal stress caused by the insert-molding.

12. A resinous structure according to claim 11, wherein said portion has an opening for allowing the intrusion of the shaft member larger than the cross-section of said shaft member.

13. A resinous structure according to claim 11, wherein said resinous structure has a first holding portion and a second holding portion to hold the shaft member embedded therein, both holding portions being formed integrally.

14. A resinous structure according to claim 13, wherein said resinous structure has a portion where said shaft member is exposed to the exterior.

15. A resinous structure according to claim 11, wherein said resinous structure embedded with the shaft member is applied to a camera.

16. A resinous structure according to claim 15, wherein said shaft member includes a buckle shaft for holding a cover of a camera.

17. A resinous structure according to claim 15, wherein said shaft member includes a holding shaft in a camera.

18. A resinous structure according to claim 11, wherein said portion allowing the intrusion of the shaft member includes a void.

19. A resinous structure according to claim 11, wherein said portion for allowing the intrusion of the shaft member is located only at a position to which one end of the shaft member extends.

20. A resinous structure according to claim 11, wherein said shaft member includes a structure which prevents the movement of the shaft member relative to the resinous structure.

21. A resinous structure according to claim 11, wherein said portion allowing the intrusion of the bar member includes a void.

22. A structure embedded with a shaft member by insert-molding, comprising:
(A) a shaft member; and
(B) a formed structure embedded with the shaft member by insert-molding, said formed structure being made of material having a thermal expansion coefficient different from that of the shaft member and having a portion which allows intrusion thereinto of the shaft member so as to prevent internal stress caused by the insert-molding and said portion being located at a position facing at least one end of the shaft member.

23. A structure according to claim 22, wherein said portion has an opening for allowing the intrusion of the shaft member larger than the cross-section of said shaft member.

24. A structure according to claim 22, wherein said formed structure has a first holding portion and a second holding portion for holding said shaft member, both portions being formed integrally.

25. A structure according to claim 24, wherein said formed structure has a portion in which the shaft member is exposed to the exterior.

26. A structure according to claim 22, wherein said structure is applied to a camera.

27. A structure according to claim 26, wherein said shaft member includes a buckle shaft for holding a cover of a camera.

28. A structure according to claim 26, wherein said shaft member includes a holding shaft in a camera.

29. A structure according to claim 22, wherein said portion allowing the intrusion of the shaft member includes a void.

30. A structure according to claim 22, wherein said portion for allowing the intrusion of the shaft member is located only at a postion to which one end of the shaft member extends.

31. A structure according to claim 22, wherein said shaft member includes a structure which prevents the movement thereof relative to the formed structure.

32. A resinous structure in which a bar member is embedded by insert-molding, comprising:
(A) a metallic bar member; and
(B) a resionous structure in which said bar member is embedded by insert-molding, said resinous structure having a portion allowing intrusion thereinto of said bar member so as to prevent internal stress due to the insert-molding, said portion being located at a portion of said resinous material to which at least one end of said bar member extends.

33. A resinous structure according to claim 32, wherein said void has an opening for intrusion of said bar member larger than the cross-section of said bar member.

34. A resinous structure according to claim 32, wherein said resinous structure has a first holding portion and a second holding portion to hold the bar member embedded therein, both holding portions being formed integrally.

35. A resinous structure according to claim 34, wherein said resinous structure has a portion where said bar member is exposed to the exterior.

36. A resinous structure according to claim 32, wherein said resinous structure embedded with the bar member is applied to a camera.

37. A resinous structure according to claim 36, wherein said bar member includes a buckle shaft for holding a cover of a camera.

38. A resinous structure according to claim 36, wherein said bar member includes holding shaft in a camera.

39. A resinous structure embedded with a bar member by insert-molding, comprising:
(A) a bar member; and
(B) a resinous structure in which the bar member is embedded by insert-molding, said resinous structure being made of resin material having a thermal expansion coefficient different from that of said bar member, and having a portion allowing intrusion thereinto of said bar member so as to prevent internal stress caused by the insert-molding.

40. A resinous structure according to claim 39, wherein said portion has an opening for allowing the intrusion of the bar member larger than the cross-section of said bar member.

41. A resinous structure according to claim 39, wherein said resinous structure has a first holding portion and a second holding portion to hold the bar member embedded therein, both holding portions being formed integrally.

42. A resinous structure according to claim 41, wherein said resinous structure has a portion where said bar member is exposed to the exterior.

43. A resinous structure according the claim 42, wherein said portion allowing the intrusion of the bar member includes a void.

44. A resinous structure according to claim 42, wherein said portion for allowing the intrusion of the bar member is located only at a position to which one end of the bar member extends.

45. A resinous structure according to claim 42, wherein said bar member includes a structure which prevents the movement of the bar member relative to the resinous structure.

46. A resinous structure according to claim 39, wherein said resinous structure embedded with the bar member is applied to a camera.

47. A resinous structure according to claim 46, wherein said bar member includes a buckle shaft for holding a cover of a camera.

48. A resinous structure according to claim 46, wherein said bar member includes a holding shaft in a camera.

49. A resinous structure according to claim 39, wherein said portion for allowing the intrusion of the bar member is located only at a position to which one end of the bar member extends.

50. A resinous structure according to claim 39, wherein said bar member includes a structure which prevents the movement of the bar member relative to the resinous structure.

51. A structure embedded with a bar member by insert-molding, comprising:
   (A) a bar member; and
   (B) a formed structure embedded with the bar member by insert-molding, said formed structure being made of material having a thermal expansion coefficient different from that of the bar member and having a portion which allows intrusion thereinto of the bar member so as to prevent internal stress caused by the insert-molding and said portion being located at a position facing at least one end of the bar member.

52. A structure according to claim 51, wherein said portion has an opening for allowing the intrusion of the bar member larger than the cross-section of said bar member.

53. A structure according to claim 51, wherein said formed structure has a first holding portion and a second holding portion for holding said bar member, both portions being formed integrally.

54. A structure according to claim 53, wherein said formed structure has a portion in which the bar member is exposed to the exterior.

55. A structure according to claim 51, wherein said structure is applied to a camera.

56. A structure according to claim 55, wherein said bar member includes a buckle shaft for holding a cover of a camera.

57. A structure according to claim 55, wherein said bar member includes a holding shaft in a camera.

58. A structure according to claim 51, wherein said portion allowing the intrusion of the bar member includes a void.

59. A structure according to claim 51, wherein said portion for allowing the intrusion of the bar member is located only at a position to which one end of the bar member extends.

60. A structure according to claim 51, wherein said bar member includes a structure which prevents the movement thereof relative to the formed structure.

* * * * *

UNITED STATES PATENT AND TRADEMARK OFFICE
CERTIFICATE OF CORRECTION

PATENT NO. : 4,758,855
DATED : July 19, 1988
INVENTOR(S) : H. TAMAMURA, ET AL.

It is certified that error appears in the above-identified patent and that said Letters Patent is hereby corrected as shown below:

COLUMN 2

Line 51, "described," should read --described--.
    Line 68, "Thsu," should read --Thus,--.

COLUMN 3

Line 48, "sahft" should read --shaft--.
    Line 63, "whcih" should read --which--; and
    "forciable" should read --forcible--.

COLUMN 5

Lines 19-20, "bar/member" shoud read
    --shaft member--.
    Line 64, "resionous" should read --resinous--.

Signed and Sealed this

Fourteenth Day of February, 1989

Attest:

DONALD J. QUIGG

Attesting Officer      Commissioner of Patents and Trademarks